(12) United States Patent
Nishino et al.

(10) Patent No.: US 8,548,202 B2
(45) Date of Patent: Oct. 1, 2013

(54) MOVING OBJECT DETECTING DEVICE, MOVING OBJECT DETECTING METHOD, AND COMPUTER PROGRAM

(75) Inventors: Katsuaki Nishino, Kanagawa (JP); Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 709 days.

(21) Appl. No.: 12/776,474

(22) Filed: May 10, 2010

(65) Prior Publication Data
US 2010/0290672 A1  Nov. 18, 2010

(30) Foreign Application Priority Data
May 14, 2009 (JP) .................. P2009-117388

(51) Int. Cl.
*G06K 9/00* (2006.01)

(52) U.S. Cl.
USPC ........................................... 382/107; 348/135

(58) Field of Classification Search
USPC .................... 382/100, 107; 348/135, E7.085
See application file for complete search history.

(56) References Cited

U.S. PATENT DOCUMENTS

| | | | | |
|---|---|---|---|---|
| 5,109,425 A * | 4/1992 | Lawton | ........................ | 382/107 |
| 5,220,619 A * | 6/1993 | Keokoek | ........................ | 382/153 |
| 6,661,918 B1 | 12/2003 | Gordon et al. | | |
| 6,707,486 B1 | 3/2004 | Millet et al. | | |
| 7,215,827 B2 | 5/2007 | Ito et al. | | |
| 7,227,893 B1 | 6/2007 | Srinivasa et al. | | |
| 7,558,404 B2 | 7/2009 | Ma et al. | | |
| 7,633,383 B2 * | 12/2009 | Dunsmoir et al. | ............ | 340/435 |
| 7,643,653 B2 | 1/2010 | Garoutte | | |
| 7,696,903 B2 * | 4/2010 | Stam et al. | .................... | 340/907 |
| 7,783,096 B2 * | 8/2010 | Chen et al. | .................... | 382/128 |
| 7,965,314 B1 * | 6/2011 | Miller et al. | .................. | 348/164 |
| 8,131,848 B1 * | 3/2012 | Denise | ......................... | 709/224 |
| 2005/0265626 A1 | 12/2005 | Endo et al. | | |
| 2006/0056702 A1 | 3/2006 | Tsunashima | | |
| 2006/0259574 A1 * | 11/2006 | Rosenberg | .................... | 709/217 |
| 2008/0042812 A1 * | 2/2008 | Dunsmoir et al. | ............ | 340/435 |
| 2008/0130961 A1 | 6/2008 | Kinoshita | | |
| 2008/0296393 A1 | 12/2008 | Jovanovski et al. | | |
| 2009/0147272 A1 | 6/2009 | Gibson et al. | | |
| 2009/0179869 A1 | 7/2009 | Slotznick | | |
| 2009/0245657 A1 | 10/2009 | Osugi | | |

FOREIGN PATENT DOCUMENTS

| | | |
|---|---|---|
| JP | 2006 107457 | 4/2006 |
| JP | 2007 102556 | 4/2007 |

\* cited by examiner

*Primary Examiner* — Shefali Goradia
(74) *Attorney, Agent, or Firm* — Frommer Lawrence & Haug LLP; William S. Frommer

(57) ABSTRACT

An apparatus for detecting movement of an object captured by an imaging device, the apparatus includes a moving object detection unit, that is (1) operable to detect movement of an object based on a first moving object detecting process, and (2) operable to detect movement of the object based on a second moving object detecting process. The apparatus also includes an output unit operable to generate an output based on the detection by the moving object detection unit based on at least one of the first and second moving object detecting processes.

31 Claims, 10 Drawing Sheets

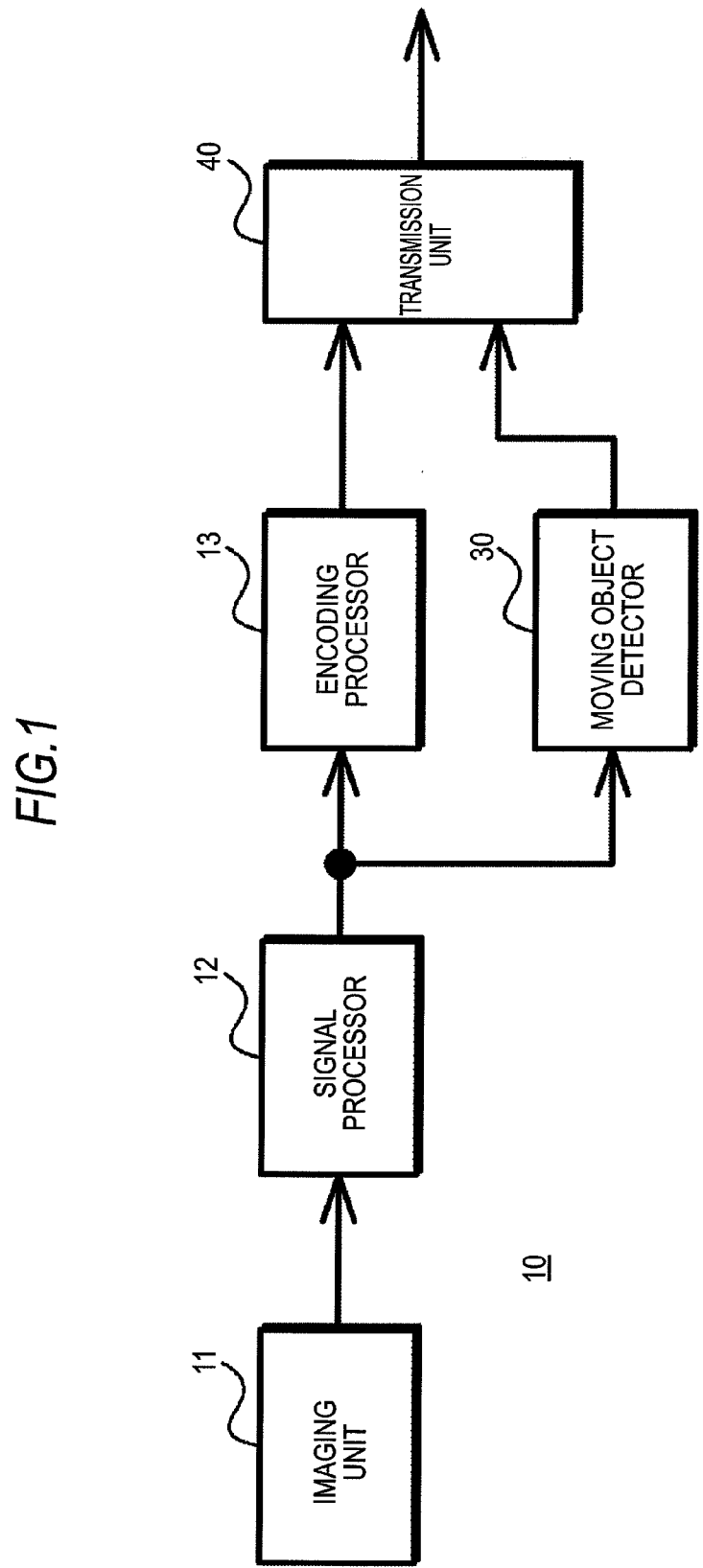

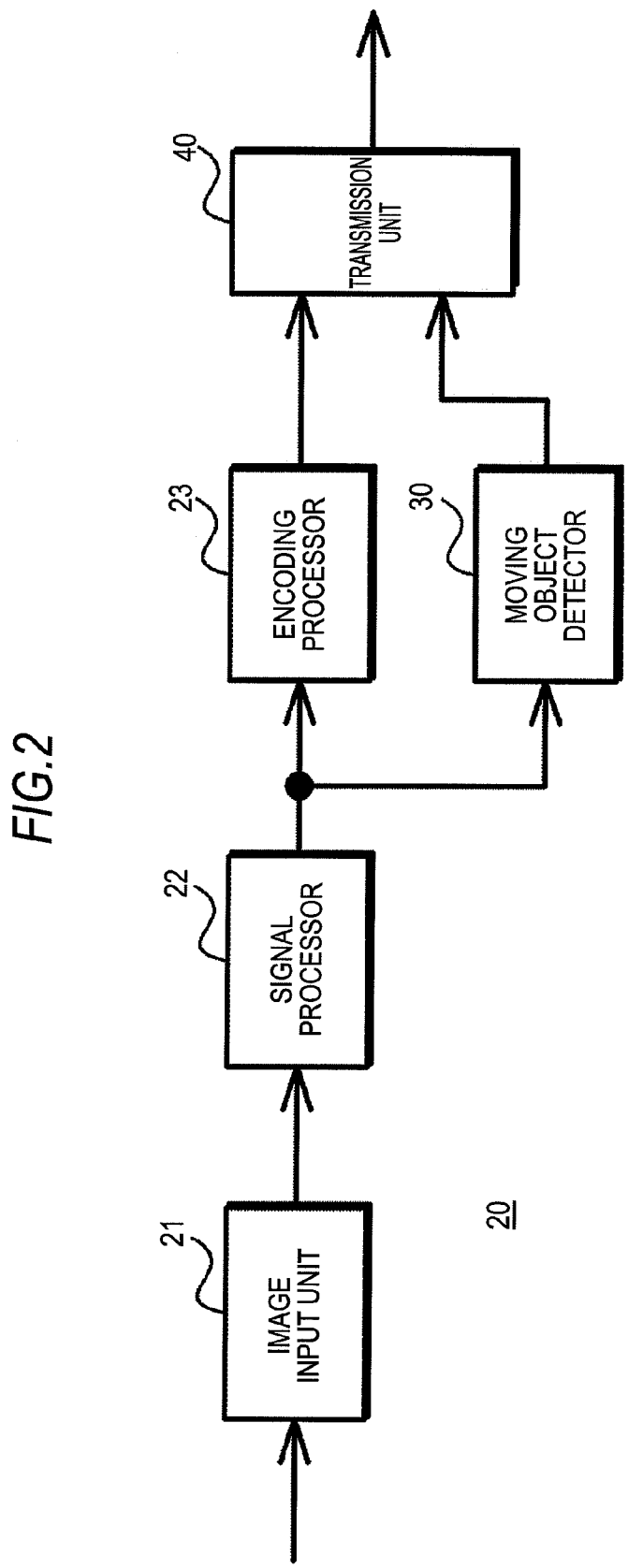

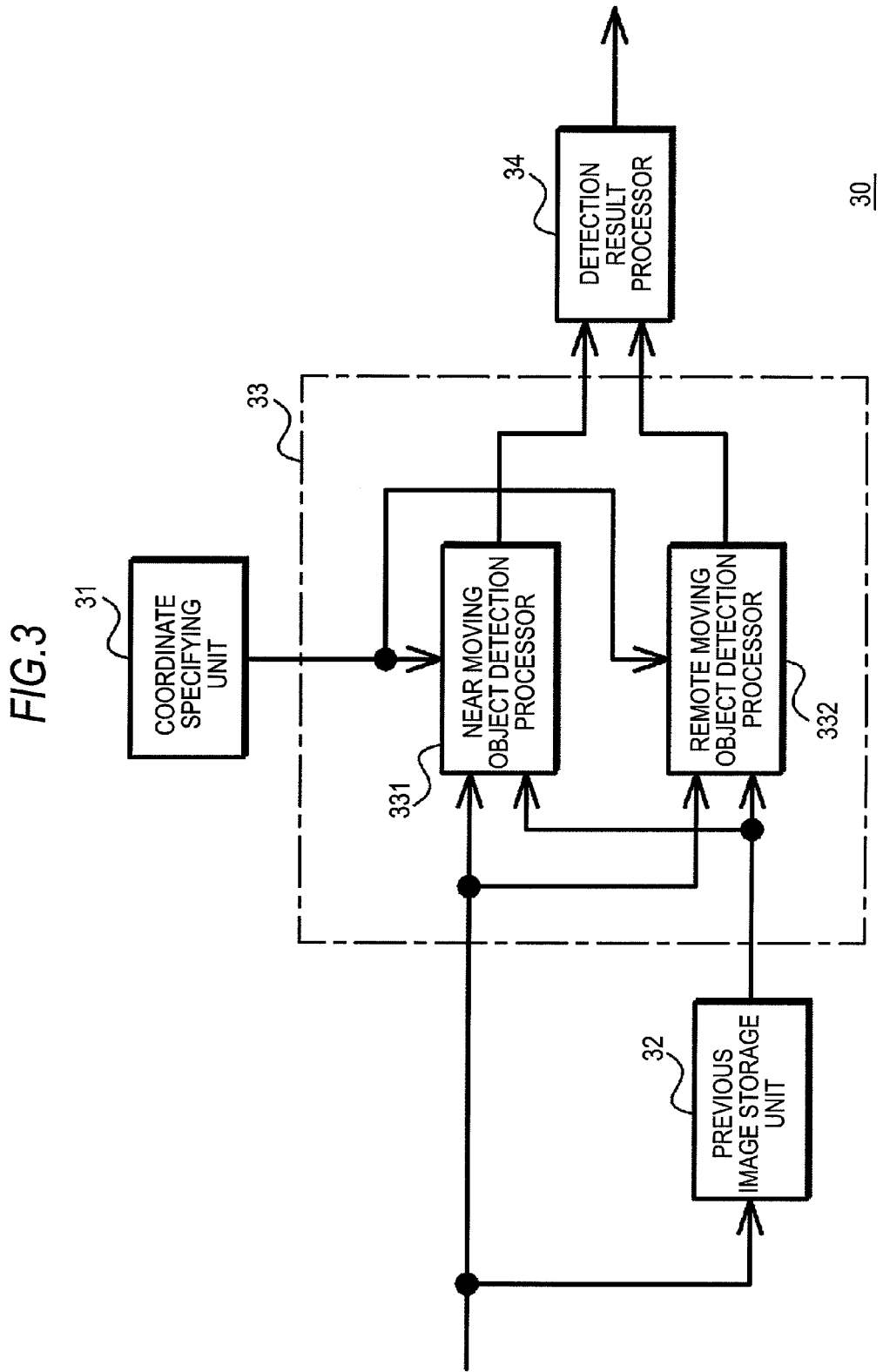

MOVING OBJECT DETECTING DEVICE, MOVING OBJECT DETECTING METHOD, AND COMPUTER PROGRAM

BACKGROUND

1. Field of the Invention

The present invention relates generally to a moving object detecting device, a moving object detecting method, and a computer program for detecting a moving object. More particularly, the present invention relates to a moving object detecting device, method and computer program that precisely detects a moving object based on whether the moving object is near or remote.

2. Background Discussion

Typically, in an intrusion detection system of a monitoring camera, a moving object is detected. For example, JP-A-2007-102556, describes that captured image data from which a motion should be detected is divided into plural area blocks depending on the number of error occurrence blocks. A status variation in the smoothed image data of each image block is detected and a map of the detected status variation blocks is compared with a map of status variation blocks detected prior to calculating the number of error occurrence blocks with the movement of the status-varied block. When the calculated number of error occurrence blocks is greater than a predetermined numerical value, it is determined that a motion is detected.

In the technique described in JP-A-2006-107457, plural sheets of previous image data are stored as reference image data. Differences in pixels or small areas are detected between the stored sheets of reference image data and captured image data. A moving object in the image data is detected on the basis of the continuity or frequency of the detected differences.

SUMMARY

However, when detecting motion in a situation in which the number of error occurrence blocks with the movement of the status-varied block is greater than a predetermined numerical value, the precision in detecting motion may be deteriorated when a moving object is remote. That is, when a moving object is remote, an image size of the moving object in the captured image is small. Accordingly, when the moving object is remote, the number of error occurrence blocks does not increase and a motion is not detected.

In the technique of detecting a moving object on the basis of the differences in pixels or small areas between the captured image data and the reference image data, the continuity or frequency of the differences greatly varies depending on whether the moving object is remote or near. Accordingly, the precision in detecting a moving object may vary greatly when the moving object is remote, from the detection device, and when the moving object is near the detection device.

Therefore, it is desirable to provide a moving object detecting device and a moving object detecting method and computer program code that can be executed by a processor, which can precisely detect a moving object, whether the moving object is remote or near the detection device, such as a camera. The method may be stored, for example, as executable program code on a non-transitory storage medium, or non-transitory electronic storage medium.

According to embodiments of the present invention, a moving object in a motion detection region is detected by plural moving object detection processors using a present image and a previous image. When the moving object is detected by one of the plurality of moving object detection processors, it is determined that the moving object is detected in the motion detection region, and the moving object detection result of the motion detection region is output by the detection result processor. Plural moving object detection processors having different moving object detection characteristics depending on the remoteness or nearness of the moving object (relative to a detection device, such as, for example, a camera, sensor, image obtaining unit or other suitable motion detection device) detected from an image of the motion detection region are used as the plural moving object detection processors. Accordingly, it is possible to precisely detect a moving object, whether the moving object is located remotely or nearby.

Accordingly, one embodiment of the present invention is directed to an apparatus (the apparatus) for detecting movement of an object captured by an imaging device, such as a camera. The apparatus includes a moving object detection unit, that is: (1) operable to detect movement of an object based on a first moving object detecting process, and (2) operable to detect movement of the object based on a second moving object detecting process. The apparatus also includes an output unit operable to generate an output based on the detection by the moving object detection unit based on at least one of the first and second moving object detecting processes.

Another embodiment of the present invention is directed to the apparatus described above, wherein the first moving object detecting process is different than the second moving object detecting process.

Yet another embodiment of the present invention is directed to the apparatus described above, wherein each of the first and the second moving detecting processes operates in accordance with at least one of a plurality of detection factors.

Yet another embodiment of the present invention is directed to the apparatus described above, wherein the at least one of the plurality of detection factors includes motion vector detection, using a plurality of captured images.

Yet another embodiment of the present invention is directed to the apparatus described above, wherein the plurality of captured images includes one or more previously captured images.

Yet another embodiment of the present invention is directed to the apparatus described above, wherein the plurality of captured images includes one or more presently captured images.

Yet another embodiment of the present invention is directed to the apparatus described above and also includes a storage unit operable to store at least one of the plurality of captured images.

Yet another embodiment of the present invention is directed to the apparatus described above, wherein the moving object detection unit includes a camera.

Yet another embodiment of the present invention is directed to the apparatus described above, wherein at least one of the plurality of detection factors includes normalized correlation detection, using a plurality of captured images.

Yet another embodiment of the present invention is directed to the apparatus described above, wherein the at least one of the plurality of detection factors comprises at least one of a spatial resolution associated with distance on an image display screen; and a temporal resolution associated with an interval between captured images.

Yet another embodiment of the present invention is directed to the apparatus described above and also includes a coordinate specifying unit operable to provide a motion detection region and the moving object detection unit is operable to detect the movement of the object within the motion detection region and the output includes an indication of proximity of the location of the object relative to the imaging device.

Yet another embodiment of the present invention is directed to the apparatus described above, wherein the output includes an indication of proximity of the location of the object relative to the imaging device.

Yet another embodiment of the present invention is directed to the apparatus described above, wherein the first moving object detecting process corresponds to a location of the object having a first proximity with respect to the imaging device, and the second moving object detecting process corresponds to a location of the object having a second proximity with respect to the imaging device. The first proximity is further from the imaging device than the second proximity.

Yet another embodiment of the present invention is directed to the apparatus described above, wherein the second moving object detecting process corresponds to a location of the object having a second proximity with respect to the imaging device. The first proximity is further from the imaging device than the second proximity.

Yet another embodiment of the present invention is directed to the apparatus described above, wherein the output is indicative of detected motion of the object.

Yet another embodiment of the present invention is directed to the apparatus described above, wherein the moving object detection unit includes first and second moving object detection processors and the first moving object detection processor includes a first processing requirement such that the first moving object detecting process is selected based on the first processing requirement.

Yet another embodiment of the present invention is directed to the apparatus described above, wherein the first moving object detecting process includes a motion detecting technique.

Yet another embodiment of the present invention is directed to the apparatus described above and the second moving object detection processes includes a second processing requirement such that the second moving object detecting process is selected based on the second processing requirement.

Yet another embodiment of the present invention is directed to the apparatus described above and the second moving object detecting process comprises a motion detecting technique.

Yet another embodiment of the present invention is directed to the apparatus described above and wherein at least one of the first moving object detecting process and the second moving object detecting process comprise a process that includes motion vector detection and normalized correlation detection.

Yet another embodiment of the present invention is directed to the apparatus described above wherein at least one of the first moving object detecting process and the second moving object detecting process comprise a process includes spatial resolution including a first resolution spatial setting and a second resolution spatial setting. The first resolution spatial setting is lower than the second resolution spatial setting.

Yet another embodiment of the present invention is directed to the apparatus described above, wherein at least one of the first moving object detecting process and the second moving object detecting process comprise a process including temporal resolution including a first frame rate setting and a second frame rate setting. The first frame rate setting is lower than the second frame rate setting.

Yet another embodiment of the present invention is directed to the apparatus described above, wherein the first moving object detecting process and the second moving object detecting process comprise processes that includes motion vector detection and normalized correlation detection as well as a first resolution spatial setting and a second resolution spatial setting. The first resolution spatial setting is lower than the second resolution spatial setting.

Yet another embodiment of the present invention is directed to the apparatus described above, wherein the first moving object detecting process and the second moving object detecting process comprise processes including motion vector detection and normalized correlation detection; and a first frame rate setting and a second frame rate setting. The first frame rate setting is lower than the second frame rate setting.

Yet another embodiment of the present invention is directed to the apparatus described above, wherein the first moving object detecting process and the second moving object detecting process include motion vector detection and normalized correlation detection; a first resolution spatial setting and a second resolution spatial setting; and a first frame rate setting and a second frame rate setting. The first resolution spatial setting is lower than the second resolution spatial setting; and the first frame rate setting is lower the second frame rate setting.

Yet another embodiment of the present invention is directed to a method for detecting a moving object (the method) that includes using one or more first detection factors to detect movement of an object to provide a first object detection output and using one or more second detection factors to detect movement of an object to provide a second object detection output. An output is produced if the first and/or second object detection output is provided.

Yet another embodiment of the present invention is directed to the method as described above wherein the first detection factors are different than the second detection factors.

Yet another embodiment of the present invention is directed to the method described above, wherein the first object detection output is different than the second object detection output.

Yet another embodiment of the present invention is directed to the method described above, wherein the first detection factors include a first detecting method; a first spatial direction resolution; and a first time domain resolution.

Yet another embodiment of the present invention is directed to the method described above, wherein the second detection factors include a second detecting method; a second spatial direction resolution; and a second time domain resolution.

Yet another embodiment of the present invention is directed to the method described above, wherein using the one or more first detection factors include selecting a first moving object detecting process from among a plurality of moving object detecting processes.

Yet another embodiment of the present invention is directed to the method described above, wherein selecting the first moving object detecting process includes selecting a normalized correlation detecting method.

Yet another embodiment of the present invention is directed to the method described above, wherein selecting the first moving object detecting process includes selecting a normalized correlation detecting method; and reducing a spatial direction resolution associated with distance on a display screen. The spatial direction resolution is reduced as a function of the object being closer with respect to captured images of the object.

Yet another embodiment of the present invention is directed to the method described above, wherein selecting the first moving object detecting process includes selecting a normalized correlation detecting method; and increasing a temporal resolution associated with an interval between captured images of the object, wherein the temporal resolution is increased as a function of the object being located closer with respect to the captured images of the object.

Yet another embodiment of the present invention is directed to the method described above, wherein selecting the first moving object detecting process includes selecting a normalized correlation detecting method, and reducing a spatial direction resolution associated with distance on a display screen. The spatial direction resolution is reduced as a function of the object being located closer with respect to captured images of the object; and increasing a temporal resolution associated with an interval between the captured images of the object. The temporal resolution is increased as a function of the object being located closer with respect to the captured images of the object.

Yet another embodiment of the present invention is directed to the method described above, wherein using the one or more second detection factors includes selecting a second moving object detecting process from among a plurality of moving object detecting processes.

Yet another embodiment of the present invention is directed to the method described above, wherein selecting the second moving object detecting process includes selecting a motion vector detecting method.

Yet another embodiment of the present invention is directed to the method described above, wherein selecting the second moving object detecting process includes selecting a motion vector detecting method and increasing a spatial direction resolution associated with distance on a display screen, wherein the spatial direction resolution is increased as a function of the object being located farther with respect to captured images of the object.

Yet another embodiment of the present invention is directed to the method described above, wherein selecting the first moving object detecting process includes selecting a motion vector detecting method; and reducing a temporal resolution associated with an interval between captured images of the object. The temporal resolution is reduced as a function of the object being located farther with respect to the captured images of the object.

Yet another embodiment of the present invention is directed to the method described above, wherein selecting the first moving object detecting process includes selecting a motion vector detecting method, and increasing a spatial direction resolution associated with distance on a display screen. The spatial direction resolution is increased as a function of the object being located farther with respect to captured images of the object; and reducing a temporal resolution associated with an interval between the captured images of the object. The temporal resolution is reduced as a function of the object being located farther with respect to the captured images of the object.

Yet another embodiment of the present invention is directed to the method described above, wherein using the one or more first detection factors includes selecting a first moving object detecting process from among a plurality of moving object detecting processes based on a processing power requirement for executing the selected first moving object detecting process.

Yet another embodiment of the present invention is directed to the method described above, wherein using the one or more second detection factors includes selecting a second moving object detecting process from among a plurality of moving object detecting processes based on a processing power requirement for executing the selected second moving object detecting process.

Yet another embodiment of the present invention is directed to a non transitory computer readable recording medium for storing a computer program for detecting a moving object, wherein the program executes the steps of:

using one or more first detection factors to detect movement of an object to provide a first object detection output;

using one or more second detection factors to detect movement of an object to provide a second object detection output; and producing an output if said first and/or second object detection output is provided.

Yet another embodiment of the present invention is directed to the computer readable recording medium described above, wherein the first object detection output is different than the second object detection output.

Yet another embodiment of the present invention is directed to a moving object detector comprising:

a processing unit configured to operate in accordance with one or more first parameters to detect movement of an object and produce a first object detection output, the processing unit being further configured to operate in accordance with one or more second parameters, the one or more second parameters being different than the one or more first parameters, to detect the movement of an object and produce a second object detection output; and a detection result processor configured to produce an output indicating a moving object if at least one output from the processing unit is produced.

BRIEF DESCRIPTION OF THE DRAWINGS

Disclosed are certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 is a functional block diagram illustrating a configuration in which a moving object detecting device is combined with an imaging device according to an embodiment of the present invention.

FIG. 2 is a functional block diagram illustrating a configuration in which a moving object detecting device is disposed in an image processing device separated from a camera head unit according to another embodiment of the present invention.

FIG. 3 is a diagram illustrating a configuration of a moving object detector according to yet another embodiment of the present invention.

DETAILED DESCRIPTION

Figure 4A:
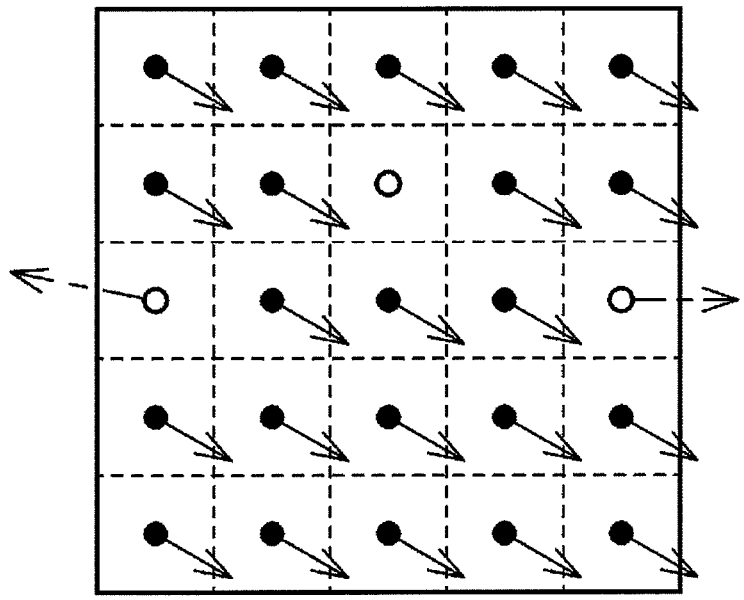
FIGS. 4A and 4B are diagrams illustrating motion vectors detected for every pixel in a moving object detection range according to yet another embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Hereinafter, embodiments of the invention will be described. In the embodiments, a plurality of moving object detection processors are provided to detect a moving object, so that a moving object can be detected by one moving object detection processor, whether the moving object is located remotely or nearby. The moving object detection processors perform a moving object detecting process while changing at least one of, for example, a moving object detecting method, a size or resolution of a motion detection region in a spatial direction, and a resolution in a time direction. The description is made in the following order:

1. Moving Object Detecting Device;
2. Moving Object Detecting Method;
3. Moving Object Detecting Operation; and
4. Configuration for Detecting Moving Object by software.

1. Moving Object Detecting Device

FIG. 1 is a functional block diagram illustrating a configuration in which a moving object detecting device is combined with an imaging device according to an embodiment of the invention. An imaging device 10 includes an imaging unit 11, a signal processor 12, an encoding processor 13, a moving object detector 30, and a transmission unit 40.

The imaging unit 11 includes a solid-state imaging device such as a CCD (Charge Coupled Device) image sensor or a CMOS (Complementary Metal Oxide Semiconductor) image sensor. The imaging unit 11 captures, for example, an image of a monitored target area and outputs an image signal.

The signal processor 12 performs a noise removing process, a coloring process, a gray-scale compressing process, and other similar processing functions depending on the desired quality and system requirements or constraints on the image signal output from the imaging unit 11.

The encoding processor 13 compresses the image signal processed by the signal processor 12 using a predetermined encoding method. The encoding processor encodes the image signal using JPEG (Joint Photographic Experts Group) or MPEG4 (Moving Picture Experts Group phase 4), for example, or any other suitable encoding process or encoding method. The encoding processor 13 outputs the encoded signal obtained through the encoding process to the transmission unit 40.

The moving object detector 30 detects a moving object on the basis of the image signal output from the signal processor 12. The moving object detector 30 outputs the moving object detection result to the transmission unit 40.

The transmission unit 40 supplies external devices, such as, for example, a monitoring controller performing a monitoring control, with the moving object detection result from the moving object detector 30 and the encoded signal obtained from the encoding processor 13 via a network or the like.

FIG. 2 is a functional block diagram illustrating a configuration in which the moving object detecting device is disposed in an image processing apparatus separated from a camera head unit according to another embodiment of the invention. The image processing apparatus 20 includes an image input unit 21, a signal processor 22, an encoding processor 23, a moving object detector 30, and a transmission unit 40.

The image input unit 21 is an interface for connecting the camera head unit (shown in FIG. 9) to the image processing apparatus. The image input unit 21 performs a process of converting an analog image signal into a digital image signal, for example, when the analog image signal is supplied from the camera head unit.

The signal processor 22 performs a noise removing process, a coloring process, a gray-scale compressing process, and other similar processing functions depending on the desired quality and system requirements or constraints on the image signal supplied from the camera head unit.

The encoding processor 23 compresses the image signal processed by the signal processor 22 using a predetermined encoding method. The encoding processor compresses the image signal using JPEG or MPEG4, for example, or any other suitable encoding process or encoding method. The encoding processor 23 outputs the encoded signal obtained through the encoding process to the transmission unit 40.

The moving object detector 30 detects a moving object on the basis of the image signal output from the signal processor 22. The moving object detector 30 outputs the moving object detection result to the transmission unit 40.

The transmission unit 40 supplies external devices such as, for example, a monitoring controller performing a monitoring control with the moving object detection result from the moving object detector 30 and the encoded signal obtained from the encoding processor 23 via a network or the like.

FIG. 3 is a diagram illustrating the configuration of the moving object detector according to an embodiment of the invention. The moving object detector 30 detects a moving object on the basis of a position specified by a user. The moving object detector 30 includes a coordinate specifying unit 31, a previous image storage unit 32, a detection processor 33, and a detection result processor 34.

The coordinate specifying unit 31 sets up a motion detection region from which a moving object is detected by the detection processor 33 in accordance with a user's operation. For example, the position specified by the user is sent to the detection processor 33 as a reference for the motion detection region.

The previous image storage unit 32 stores previous images necessary for the detection of a moving image in the detection processor 33. The previous image storage unit 32 updates the stored previous images with the passage of time.

The detection processor 33 includes a plurality of moving object detection processors detecting a moving object in the motion detection region using the present image and the previous images. The plurality of moving object detection processors have different moving object detection characteristics or factors depending on the remoteness or nearness of the moving object detected from the captured image within the motion detection region.

For example, the detection processor 33 includes a near moving object detection processor 331 and a remote moving object detection processor 332 as the plurality of moving object detection processors. The near moving object detection processor 331 and the remote moving object detection processor 332 detect a moving object in the motion detection region using image signals of the previous images stored in the previous image storage unit 32 and image signals of the present image supplied from signal processors 12 and 22. Here, the near moving object detection processor 331 sets up moving object detection so as to detect a near moving object. The remote moving object detection processor 332 sets up moving object detection so as to detect a remote moving object. The moving object detection setups in the plurality of moving object detection processors may include, for example, a moving object detecting method, a range of the motion detection region based on the position sent from the coordinate specifying unit 31, a resolution of the motion detection region, and a resolution in the time domain.

The detection result processor 34 combines the detection results of the plurality of moving object detection processors 331, 332 of the detection processor 33 and outputs the result to the transmission unit 40. For example, when a moving object is detected by one of the plurality of moving object detection processors, the detection result processor 34 determines that the moving object is detected in the motion detection region and outputs the moving object detection result of the motion detection region to the transmission unit 40. The detection result processor 34 may include information indicating which of the plurality of moving object detection processors has detected the moving object in the moving object detection result. When the moving object detection result includes the information indicating which of the plurality of moving object detection processors has detected the moving object, it is possible to determine whether the detected moving object is located remotely or nearby relative to the detection device.

2. Moving Object Detecting Method

The detection processor 33 uses a normalized correlation and/or a motion vector in a moving object detecting method using the present image and the previous images.

In detecting a moving object using the normalized correlation, coefficient Rzncc is calculated from Expression 1 using an image signal O of the motion detection region in the present image and an image signal P of the motion detection region in the previous image. Here, "$O_{avg}$" represents the average value of the image signal O and "$P_{avg}$" represents the average value of the image signal P.

$$Rzncc = \frac{\sum (O - O_{avg})(P - P_{avg})}{\sqrt{\sum (O - O_{avg})^2 \sum (P - P_{avg})^2}} \quad (1)$$

The coefficient Rzncc of the normalized correlation has a low value when a moving object is included in the motion detection region, and has a high value when a moving object is not included in the image. Accordingly, it is determined that a moving object is detected when the coefficient Rzncc has a value lower than a threshold value.

The detection of a moving object using a motion vector will be described below. In detecting a moving object using a motion vector, a motion vector in a predetermined range around a specified coordinate is calculated for each pixel.

The motion vector is calculated using, for example, a gradient method or a block matching method. Here, the gradient method will be described. It is assumed that a gray-scale value of an image at a point (x, y) and in a frame is I(x, y, t). When an object moves and the gray-scale value of a point in the object does not vary, the temporal derivative value of the gray-scale value I is "0" as expressed by Expression 2.

$$dI/dt = 0 \quad (2)$$

When Expression 2 is developed into a Taylor series, the temporal differential of an x component is "u", and the temporal differential of a y component is "v", a constraint condition expression expressed by Expression 3 can be obtained. In Expression 3, $I_x$ represents the x partial differential of the gray-scale value I. $I_y$ and $I_t$ represent the y and t partial differentials of the gray-scale value I.

$$I_x u + I_y v + I_t = 0 \quad (3)$$

A two-dimensional motion vector is calculated using the constraint conditional expression of Expression 3, the constraint conditional expression in which the spatial variation of an optical flow in a wide range is minimized, for example, or the constraint conditional expression in which an optical flow in a local range is constant.

In the block matching method, a common part is detected from two image frames and a motion vector is calculated from a moving direction or a moving distance of the common part of two frames.

The method of calculating a motion vector is not limited to the gradient method or the block matching method, and other methods may be used. The gradient method and the block matching method are merely two examples of suitable methods for calculating a motion vector. Any other suitable method could also be used to calculate the motion vector.

Here, when a moving object is included in a predetermined range, the number of pixels having a motion vector with the same direction and the same magnitude increases. When a moving object is not included in the predetermined range, the number of pixels having a motion vector with the same direction and the same magnitude is small. Accordingly, when the number of pixels having a motion vector with the same direction and the same magnitude is greater than a threshold, it is determined that a moving object is detected.

Figure 4B:
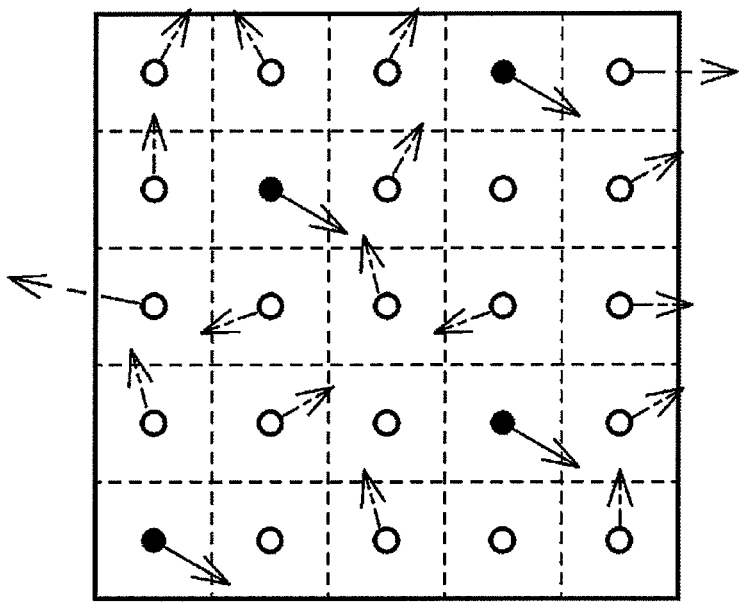

FIGS. 4A and 4B show motion vectors detected from the pixels in the moving object detection range according to an embodiment of the invention. For example, as shown in FIG. 4A, when the number of pixels having a motion vector with the same direction and the same magnitude is greater than a threshold value, it is determined that a moving object is detected. As shown in FIG. 4B, when the number of pixels having a motion vector with the same direction and the same magnitude is not greater than the threshold value, it is determined that a moving object is not detected.

The motion vector may be calculated for every pixel in the motion detection region or may be calculated only at a feature point included in the motion detection region or at a selected position.

As described above, the detection processor (FIG. 3, element 33) calculates the normalized correlation coefficient or the motion vector using the present image and the previous image and detects a moving object on the basis of the calculated coefficient or the calculated motion vector.

The detection processor (FIG. 3, element 33) detects a moving object using the image signals of the present image and the previous image. However, when the calculation result in the course of detecting a moving object can be used for the next detection of a moving object, the calculation result may be stored and a moving object may be detected using the stored calculation result and a new present image.

3. Moving Object Detecting Operation

In a moving object detecting operation, a plurality of moving object detecting processes are performed while changing at least one of the moving object detecting method, the range in the spatial direction, and the resolution in the spatial direction or the time domain, thereby detecting a moving object regardless of the remoteness or nearness of the moving object detected from the image within the motion detection region.

Here, when a moving object is located nearby, the moving object moves across a screen relatively fast and the display size on the screen is large. Alternatively, when a moving object is located remotely, the moving object moves across a screen relatively slowly and the display size on the screen is small. That is, to detect a near moving object, it is preferable that the moving object detection range is wide and the resolution in the time domain is high. To detect a remote moving object, it is preferable that the resolution in the spatial direction within the moving object detection range be high. Accordingly, the near moving object detection processor (FIG. 3, element 331) sets the moving object detecting method, the range in the spatial direction, and the resolution in the spatial direction or the time domain so as to precisely detect a near moving object. The remote moving object detection processor (FIG. 3, element 332) sets the moving object detecting method, the range in the spatial direction, and the resolution in the spatial direction or the time domain so as to precisely detect a remote moving object.

4. First Moving Object Detecting Operation

A first moving object detecting operation, in which the normalized correlation is used in the moving object detecting method will be described. In the first moving object detecting operation, the moving object detection range, that is, the size of the motion detection region, and the resolution in the spatial direction are set depending on which of a near moving object and a remote moving object should be detected.

Figure 5A:
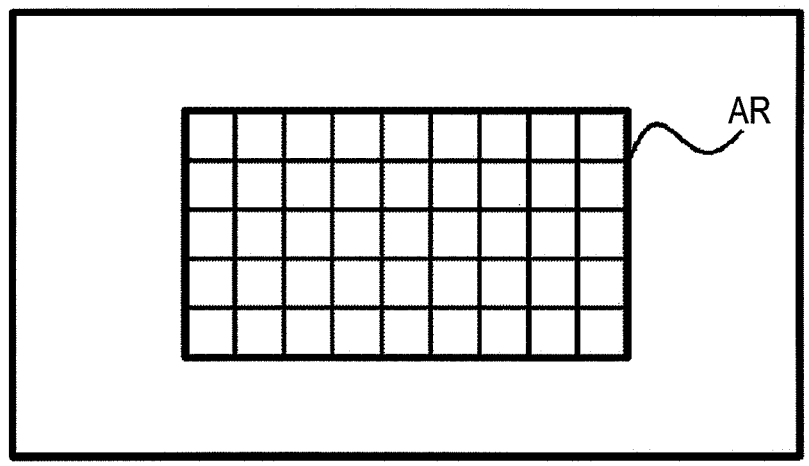
FIGS. 5A and 5B are diagrams illustrating a first moving object detecting operation according to yet another embodiment of the present invention.
Figure 5B:
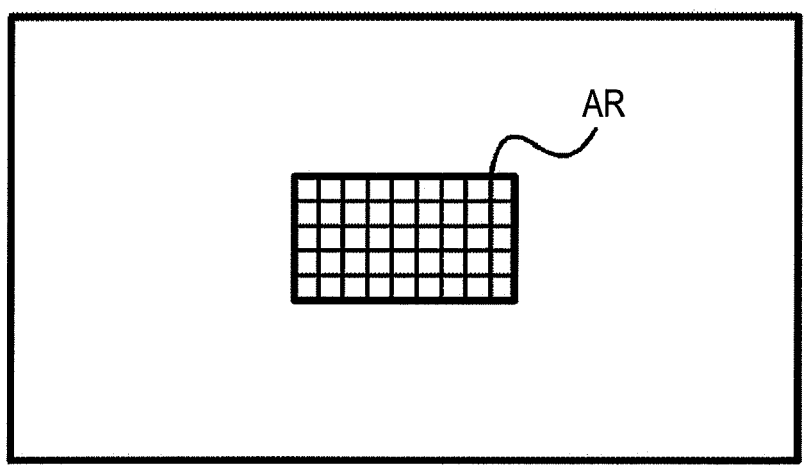

FIGS. 5A and 5B are diagrams illustrating the first moving object detecting operation according to an embodiment of the invention, where FIG. 5A shows the moving object detection setup in the near moving object detection processor (shown in FIG. 3 as element 331) and FIG. 5B shows the moving object detection setup in the remote moving object detection processor (shown in FIG. 3 as element 332).

The near moving object detection processor (FIG. 3, element 331) and the remote moving object detection processor (FIG. 3, element 332) set a motion detection region AR based on the position specified by the coordinate specifying unit (FIG. 3, element 31). Here, as shown in FIGS. 5A and 5B, the near moving object detection processor (FIG. 3, element 331) sets the size of the motion detection region to be greater than that of the remote moving object detection processor (FIG. 3, element 332). The near moving object detection processor (FIG. 3, element 331) sets the resolution of the motion detection region to be higher than that in the remote moving object detection processor (FIG. 3, element 332).

Since the motion detection region is widened by the above-mentioned setup, the near moving object detection processor (FIG. 3, element 331) can precisely detect a moving object, that is, a near moving object, which moves fast across the screen and has a relatively large display size on the screen. Since the motion detection region is narrow but the resolution is higher, the remote moving object detection processor (FIG. 3, element 332) can precisely detect a moving object, that is, a remote moving object, which moves slowly on the screen and has a relatively small display size on the screen. By setting the resolution in the spatial direction to be lower than that in the remote moving object detection processor (FIG. 3, element 332), the near moving object detection processor (FIG. 3, element 331) can easily calculate the correlation even when the motion detection region is wide. For example, the pixels may be thinned out as a method of lowering the resolution in the spatial direction. The average value of plural pixels may be calculated and the calculated average value may be used.

5. Second Moving Object Detecting Operation

In a second moving object detecting operation, the resolution in the time direction is also set up in addition to the size of the motion detection region and the resolution in the spatial direction.

Figure 6A:
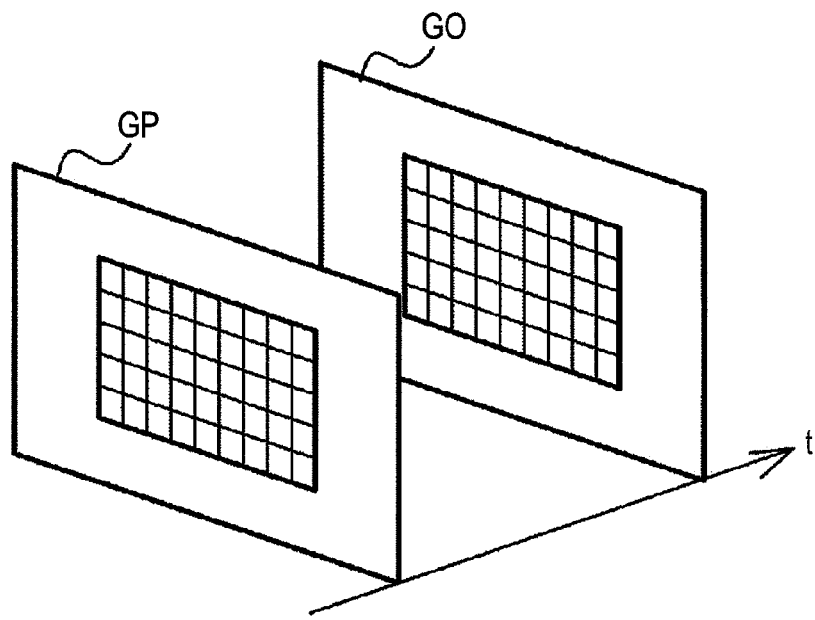
FIGS. 6A and 6B are diagrams illustrating a second moving object detecting operation according to yet another embodiment of the present invention.
Figure 6B:
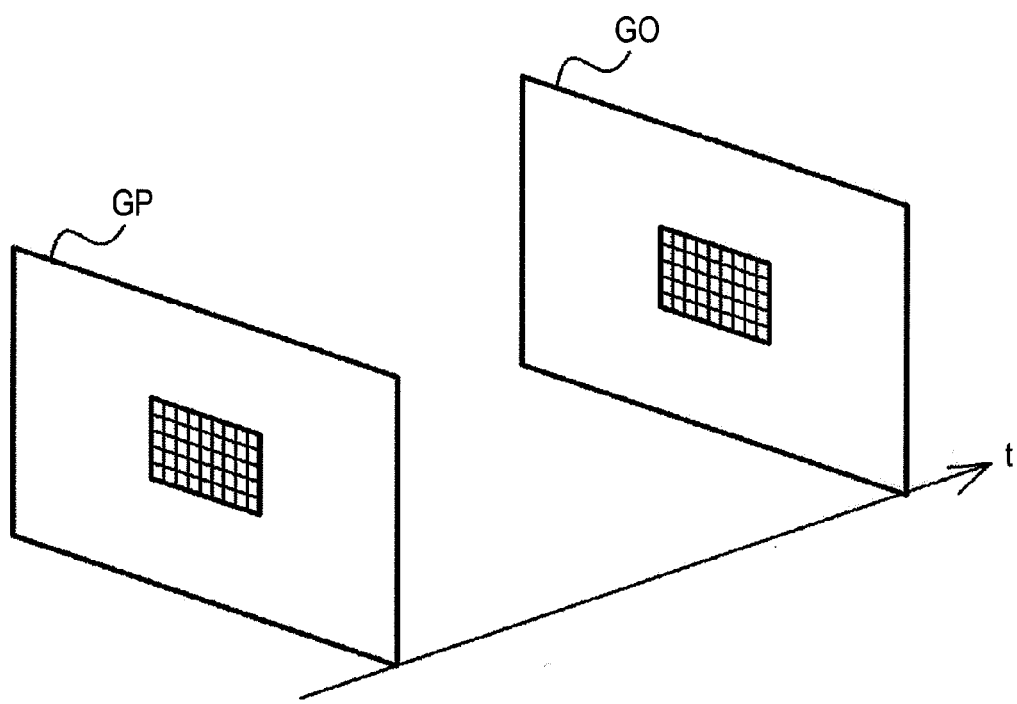

FIGS. 6A and 6B are diagrams illustrating the second moving object detecting operation according to an embodiment of the invention. FIG. 6A shows the moving object detection setup in the near moving object detection processor (shown in FIG. 3 as element 331) and FIG. 6B shows the moving object detection setup in the remote moving object detection processor (shown in FIG. 3 as element 332).

When a near moving object passes in front of an imaging device or a camera head, the near moving object detection processor (FIG. 3, element 331) sets up a frame interval between the present image GO and the previous image GP so as to include the image of the moving object in at least one of the present image and the previous image. As shown in FIGS. 6A and 6B, the remote moving object detection processor (FIG. 3, element 332) sets up the frame interval between the present image and the previous image to be greater than that in the near moving object detection processor (FIG. 3, element 331).

Since the resolution in the time domain at the time of detecting a moving object is high by the above-mentioned setup (i.e., processor 331, as shown in FIG. 3), the near moving object detection processor (FIG. 3, element 331) can precisely detect a moving object, that is, a near moving object, which moves fast across the screen.

Alternatively, since the resolution in the time domain at the time of detecting a moving object is low when the object is located at a remote distance, the remote moving object detection processor (FIG. 3, element 332) processes a smaller moving distance on the screen in contrast to the high time domain resolution case of detecting a near object using the near moving object detection processor (FIG. 3, element 331). Accordingly, it is possible to precisely detect a moving object, that is, a remote moving object, which moves slowly across the screen.

6. Third Moving Object Detecting Operation

A third moving object detecting operation, in which the motion vector is used in the moving object detecting method will be described. In the third moving object detecting operation, the size of the motion detection region and the resolution in the spatial direction are setup depending on which of a near moving object and a remote moving object should be detected.

Figure 7A:
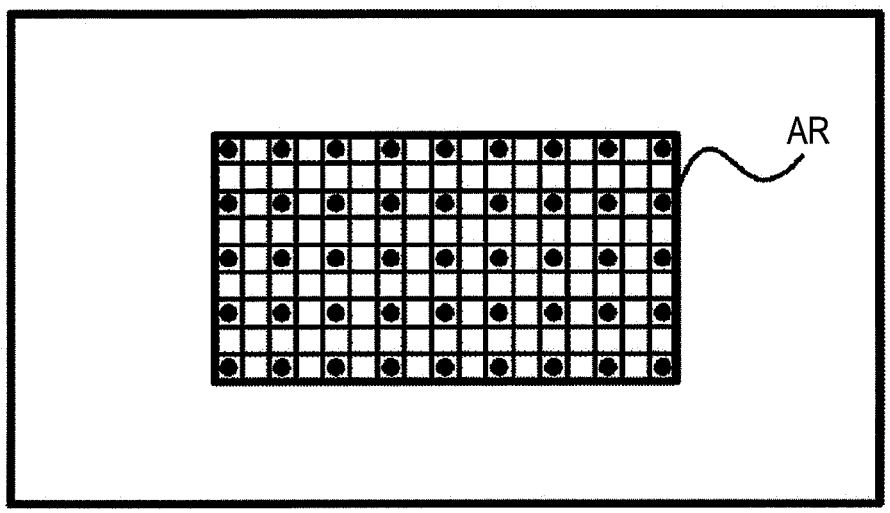
FIGS. 7A and 7B are diagrams illustrating a third moving object detecting operation according to yet another embodiment of the present invention.
Figure 7B:
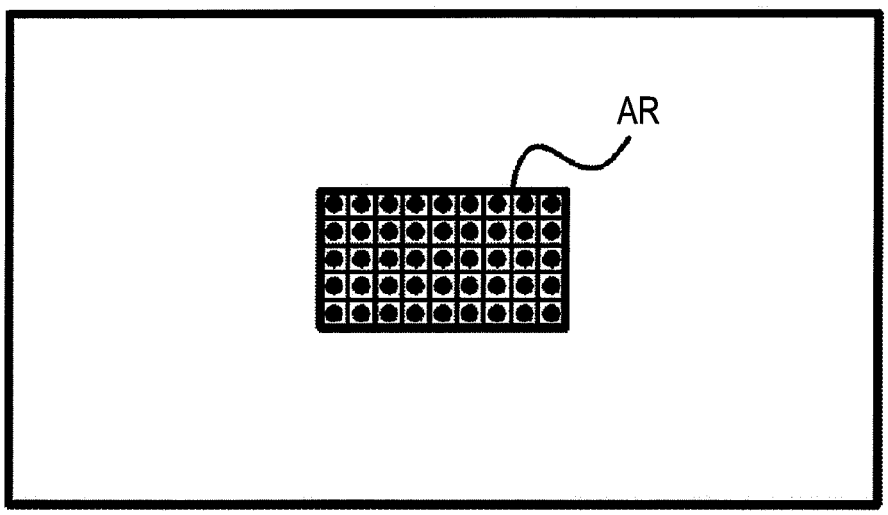

FIGS. 7A and 7B are diagrams illustrating the third moving object detecting operation according to an embodiment of the invention, where FIG. 7A shows the moving object detection setup in the near moving object detection processor (FIG. 3, element 331) and FIG. 7B shows the moving object detection setup in the remote moving object detection processor (FIG. 3, element 332).

The near moving object detection processor (FIG. 3, element 331) and the remote moving object detection processor (FIG. 3, element 332) set a motion detection region AR on the basis of the position specified by the coordinate specifying unit (FIG. 3, element 31). Here, as shown in FIGS. 7A and 7B, the near moving object detection processor (FIG. 3, element 331) sets the size of the motion detection region AR to be greater than that in the remote moving object detection processor (FIG. 3, element 332). The near moving object detection processor (FIG. 3, element 331) sets the resolution of the motion detection region to be lower than that in the remote moving object detection processor (FIG. 3, element 332).

Since the motion detection region is widened by the above-mentioned setup, the near moving object detection processor (331) can calculate a motion vector of a moving object, that is, a near moving object, which moves fast on the screen and has a large display size on the screen. Accordingly, it is possible to precisely detect the near moving object on the basis of the calculated motion vector.

Alternatively, since the motion detection region is narrow but the resolution is higher, the remote moving object detection processor (332) can calculate the motion vector of a moving object, that is, a remote moving object, which moves slowly on the screen and has a small display size on the screen. Accordingly, it is possible to precisely detect the remote moving object on the basis of the calculated motion vector.

In FIGS. 7A and 7B, the black circle represents a pixel from which the motion vector is calculated and the resolution in the near moving object detection processor (331) is set to be lower than that in the remote moving object detection processor (332). Accordingly, it is possible to prevent the number of motion vectors to be calculated from increasing at the time of detecting a near object with a large display size.

When the block matching method is used for calculating the motion vector, it is possible to perform the motion vector calculating process corresponding to the moving object to be detected by setting a searching range to be different between the near moving object detection processor (331) and the remote moving object detection processor (332). That is, it is necessary for the near moving object detection processor (331) to calculate the motion vector of an object which moves fast on the screen. However, the remote moving object detection processor (332) calculates the motion vector of an object which moves slowly on the screen. Accordingly, the near moving object detection processor (331) sets the motion searching range to be wide and the remote moving object detection processor (332) sets the motion searching range to be narrower than that of the near moving object detection processor (331). The motion vector is calculated in this set status. Accordingly, since the searching range can be set depending on the moving object to be detected, it is possible to efficiently calculate the motion vector.

7. Fourth Moving Object Detecting Operation

In a fourth moving object detecting operation, the resolution in the time direction is also set up in addition to the size of the motion detection region and the resolution in the spatial direction.

Figure 8A:
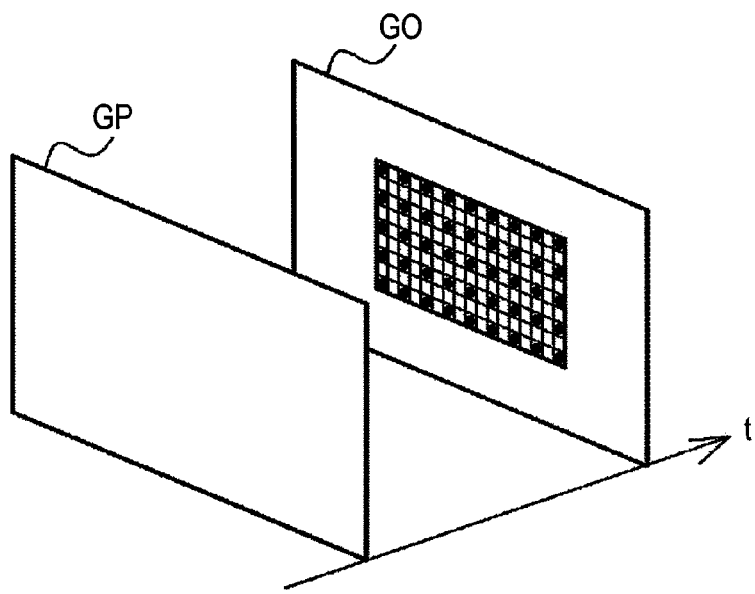
FIGS. 8A and 8B are diagrams illustrating a fourth moving object detecting operation according to yet another embodiment of the present invention.
Figure 8B:
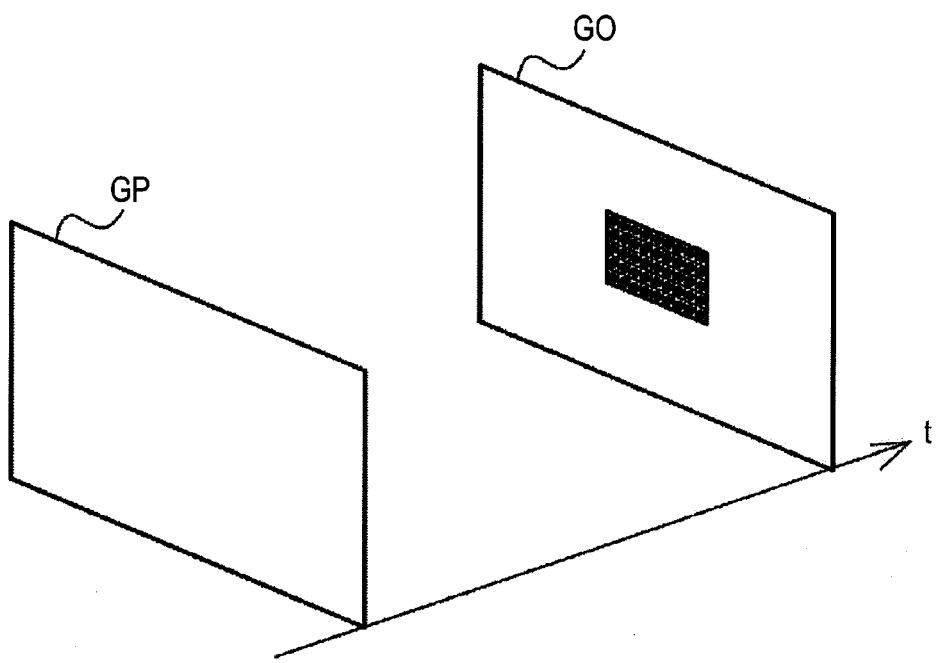

FIGS. 8A and 8B are diagrams illustrating the fourth moving object detecting operation according to an embodiment of the invention, where FIG. 8A shows the moving object detection setup in the near moving object detection processor (FIG. 3, element 331) and FIG. 8B shows the moving object detection setup in the remote moving object detection processor (FIG. 3, element 332).

When a near moving object passes in front of an imaging device or a camera head, the near moving object detection processor (331) sets up a frame interval between the present image GO and the previous image GP so as to include the image of the moving object in both of the present image and the previous image. As shown in FIGS. 8A and 8B, the remote moving object detection processor (332) sets up the frame interval between the present image GO and the previous image GP to be greater than that in the near moving object detection processor (331).

Since the resolution in the time domain at the time of detecting a moving object is high by the above-mentioned setup, the near moving object detection processor (331) can calculate the motion vector of a moving object which moves fast on the screen. Accordingly, it is possible to precisely detect the near moving object on the basis of the calculated motion vector.

Alternatively, since the resolution in the time domain at the time of detecting a moving object is low, the remote moving object detection processor (332) processes a smaller moving distance on the screen compared to the high time domain resolution case of detecting a near object using the near moving object detection processor (331). Accordingly, it is possible to correctly calculate the motion vector of a moving object, that is, a remote moving object, which moves slowly on the screen. Therefore, it is possible to precisely detect the remote moving object on the basis of the calculated motion vector.

8. Fifth Moving Object Detecting Operation

A fifth moving object detecting operation, in which the normalized correlation and the motion vector are used in the moving object detecting method will be described.

In the moving object detecting method, the near moving object detection processor (FIG. 3, element 331) detects a near moving object using a normalized correlation. The remote moving object detection processor (FIG. 3, element 332) detects a remote moving object using a motion vector.

The near moving object moves fast on the screen as described above. That is, when the frame interval between the present image and the previous image is not short such that a moving object is not included in both the present image and the previous image, it is not possible to calculate the motion vector. However, it is possible to detect a moving object using the normalized correlation when the moving object is included in only one of the present image and the previous image. Accordingly, it is preferable that the normalized correlation is used for detecting a near moving object.

A remote moving object has a small size on the screen as described above. Accordingly, to change the normalized correlation coefficient Rzncc because the remote moving object is included in the motion detection region, the motion detection region should be reduced. However, when the motion detection region is reduced and the display size of the moving object is reduced, the coefficient Rzncc can be easily influenced by noises or the like. That is, by using the normalized correlation for detecting a remote moving object, the robustness against the noises may be weakened. Accordingly, it is preferable that the motion vector is used for detecting the remote moving object.

9. Other Moving Object Detecting Operation

When a moving object detecting operation employs a combination of two or more moving object detecting operations instead of using any one of the first to fifth moving object detecting operations, described herein, it is possible to more precisely detect a moving object regardless of the remoteness or the nearness.

The near moving object detection processor (FIG. 3, element 331) detects a near moving object using a normalized correlation. The remote moving object detection processor (FIG. 3, element 332) detects a remote moving object using a motion vector. The near moving object detection processor (331) detects a moving object nearer than that in the remote moving object detection processor (332) by using at least one of a larger size of the motion detection region, a lower resolution of the motion detection region, and a higher resolution in the time direction than those in the remote moving object detection processor (332). That is, when at least one of the first to fourth moving object detecting operations, described herein, is combined with the fifth moving object detecting operation, it is possible to more precisely detect a moving object than in the case where the moving object is detected using one of the normalized correlation or the motion vector.

Figure 9:
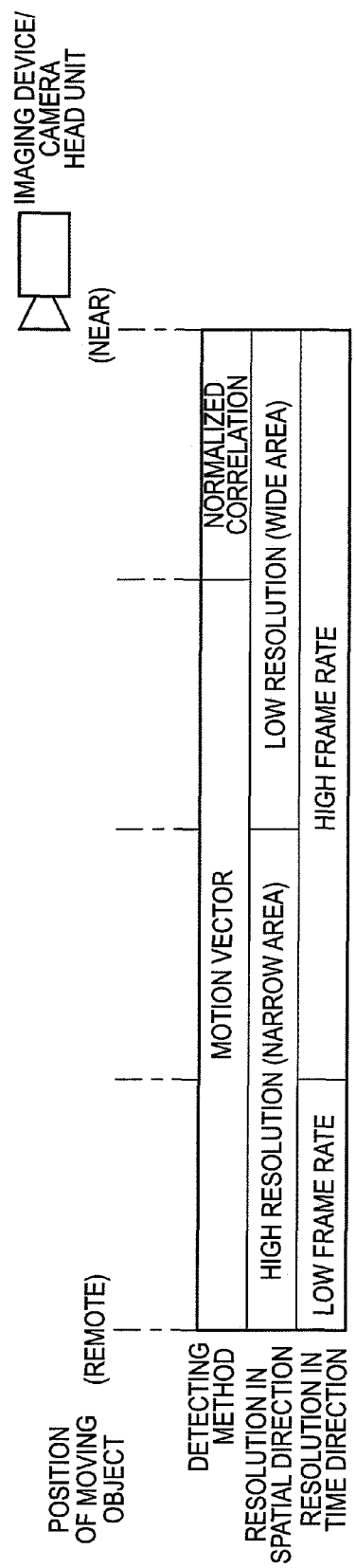
FIG. 9 is a diagram illustrating a moving object detecting method based on the remoteness and nearness of a moving object and setups of a motion detection region and a resolution in a time direction according to yet another embodiment of the present invention.

By combining the first to fifth moving object detecting operations, the remoteness and nearness of a moving object can be finely divided to detect the moving object. The embodiment of FIG. 9 shows the setups or detection factors for the moving object detecting method, the motion detection region, and the resolution in the time domain depending on the remoteness or nearness of the moving object. In FIG. 9, the remoteness and nearness of a moving object is divided into four statuses or operating modes to detect the moving object. The detection processor (FIG. 3, element 33) is provided with a moving object detection process for each divided status or operating mode.

A first moving object detecting process calculates a normalized correlation coefficient and detects a moving object on the basis of whether the coefficient is greater than a threshold value. In calculating the normalized correlation coefficient, the resolution in the spatial direction in the motion detection region is set to be low, whereby the motion detection region is set to be wide. The frame interval between the present image and the previous image is reduced, that is, the frame rate is increased, whereby the resolution in the time direction is set to be high.

A second moving object detecting process calculates a motion vector and detects a moving object on the basis of whether the number of pixels having a motion vector with the same direction and the same magnitude is greater than a threshold value. In calculating the motion vector, the resolution in the spatial direction in the motion detection region is set to be low, whereby the motion detection region is set to be wide. The frame interval between the present image and the previous image is reduced, that is, the frame rate is increased, whereby the resolution in the time direction is set to be high.

A third moving object detecting process calculates a motion vector and detects a moving object on the basis of whether the number of pixels having a motion vector with the same direction and the same magnitude is greater than a threshold value. In calculating the motion vector, the resolution in the spatial direction in the motion detection region is set to be relatively high, whereby the motion detection region is set to be relatively narrow. The frame interval between the present image and the previous image is reduced, that is, the frame rate is increased, whereby the resolution in the time direction is set to be high.

A fourth moving object detecting process calculates a motion vector and detects a moving object on the basis of whether the number of pixels having a motion vector with the same direction and the same magnitude is greater than a threshold value. In calculating the motion vector, the resolution in the spatial direction in the motion detection region is set to be higher than a threshold, whereby the motion detection region is set to be relatively narrow. The frame interval between the present image and the previous image is increased, that is, the frame rate is decreased, whereby the resolution in the time direction is set to be relatively low.

By causing the first to fourth moving object detection processes to detect a moving object, a near moving object can be precisely detected by the first moving object detection process. When the moving object moves from the near status to the remote status, the moving object can be precisely detected by the second moving object detection process. When a moving object is located remotely, the moving object can be precisely detected by the third moving object detection process. When a moving object gets located remotely, the moving object can be precisely detected by the fourth moving object detection process.

In this way, it is possible to detect a moving object by four steps depending on the remoteness or nearness of the moving object and to reduce the dependency on the distance to the moving object, thereby precisely detecting the moving object. When the information indicating which of the first to fourth moving object detection processes has detected a moving object is included in the moving object detection result, it is possible to accurately determine whether the detected moving object is located nearby or remotely with respect to the camera device that is used to detect motion of an object. The first to fourth moving object detection processes and their respective detecting methods and resolution settings (e.g., temporal and spatial) may utilize different and/or additional techniques (e.g., detection factors) for determining the proximity of a moving object. For example, a different detecting method may be adopted in order to, add to, or replace, any of the existing detecting methods within the object detection processes capable of being executed. Similarly, additional resolution or other parameters may also be incorporated within the existing object detection processes. Further, it is contemplated that one or more other moving object detection processes may be added to the first to fourth moving object detection processes. It may also be possible to selectively remove (as well as add) one or more of the existing object detection processes (e.g., remove the third moving object detecting process) using programming. This may be achieved either via a user interface (i.e., by the user) or in an automated manner that is based on certain evaluated system performance parameters (e.g., processing power of processors 331 and 332).

Each of the moving object detection processors (for example processors 331, 332, as shown in FIG. 3) may select one of the four moving object detection processes based on that particular processor's processing power, that is how much of the processor's processing resources are necessary to perform the processing. For example, the remote moving object detection processor 332 may have its detection factors set according to the fourth moving object detection process. If the remote moving object detection processor 332 detects that its processing power (processing power requirement of the processor) exceeds a particular threshold (e.g., 60% utility), the processor 332 may change its detection factors from the fourth moving object detection process to that of another moving object detection process (e.g., the second moving object detection process) having a reduced processing requirement. Moreover, based on processing power requirement, each of the moving object detection processors 331, 332 may vary one or more of its detection factors (e.g., resolution in time and/or spatial direction) individually within one of the four moving object detection processes. For example, if the near moving object detection processor 331 detects that its processing power requirement exceeds a particular threshold (e.g., 60% utility), the processor 331 may vary one or more of its detection factors (e.g., reducing resolution in time domain) in order to reduce processing power requirement. By managing processing power as a function of the moving object detection processes and their respective detection factors, problems associated with overloading a processor during execution may be avoided and, thus, object detection reliability increases as a function of processor reliability.

10. Configuration for Detecting Moving Object by Software

The above-mentioned series of processes can be embodied by hardware, or by software, or by a combination thereof. When the processes are performed by software, a computer program is installed and executed in a memory of a computer assembled into dedicated hardware. Alternatively, the computer program may be installed and executed in a general-purpose computer capable of various processes.

Figure 10:
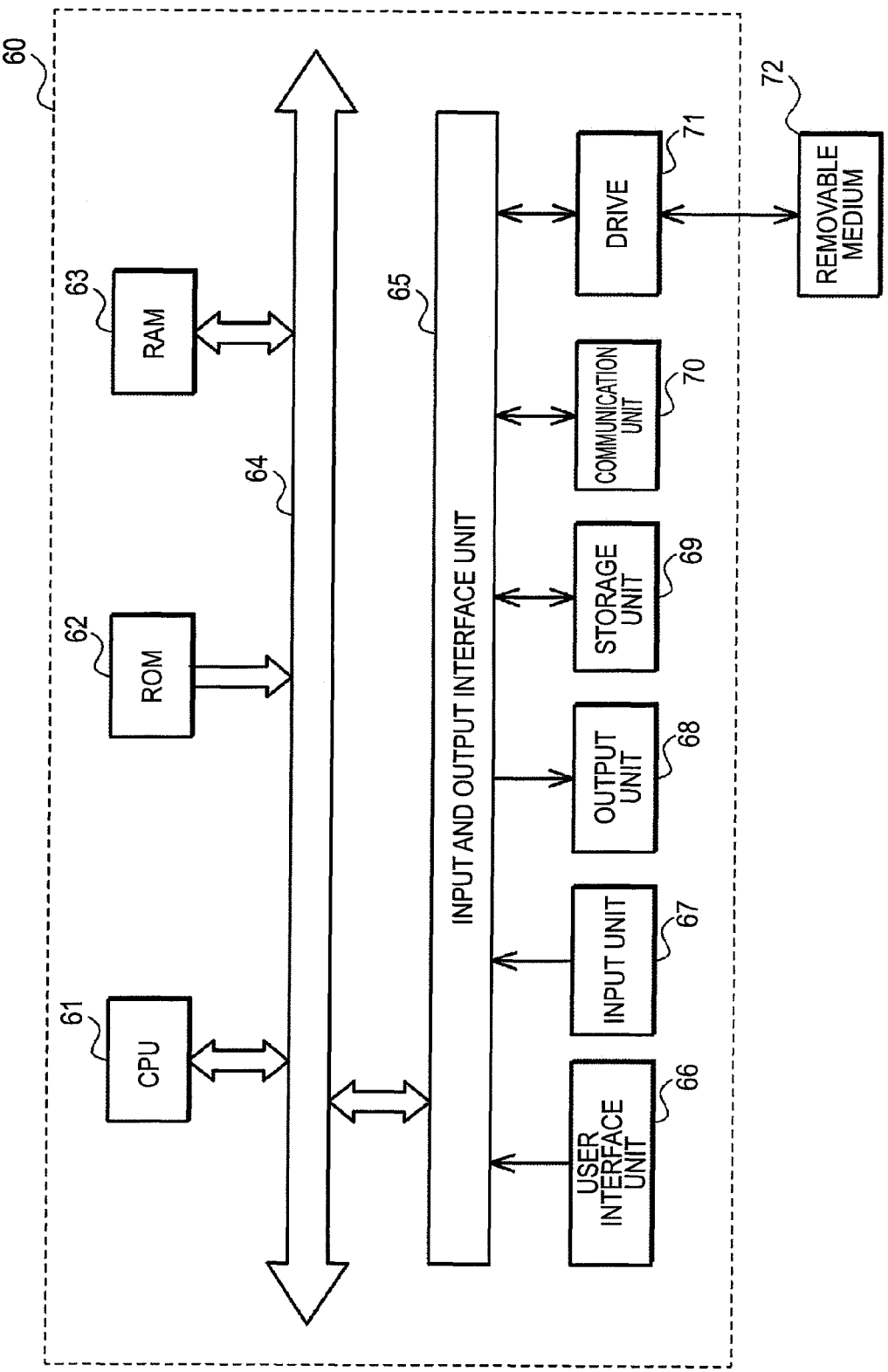
FIG. 10 is a diagram illustrating a configuration of a computer system according to yet another embodiment of the present invention.

FIG. 10 is a diagram illustrating the configuration of a computer carrying out the above-mentioned processes using a computer program according to an embodiment of the invention. A CPU (Central Processing Unit) 61 of a computer 60 performs various processes in accordance with computer programs stored in a ROM (Read Only Memory) 62 or a storage unit 69.

The computer programs executed by the CPU 61 or data used therein are properly stored in a RAM (Random Access Memory) 63. The CPU 61, the ROM 62, and the RAM 63 are connected to each other via a bus 64.

An input and output interface 65 is connected to the CPU 61 via the bus 64. A user interface unit 66 such as a touch panel, a keyboard, a mouse, and a microphone, an input unit 67 for inputting an image signal, and an output unit 68 including a display are connected to the input and output interface 65. The CPU 61 performs various processes using image signals input from the input unit 67 in response to commands input from the user interface unit 66. The CPU 61 outputs the processing results to the output unit 68.

The storage unit 69 connected to the input and output interface 65 includes, for example, a hard disk and stores computer programs executed by the CPU 61 or various data. A communication unit 70 communicates with an external device via a network such as the Internet or a local area network or a wired or wireless communication medium such as digital broadcast.

When a removable medium 72 is mounted, a drive 71 drives the removable medium and acquires stored computer programs or data stored therein. The acquired computer programs or data are transmitted to the ROM 62, the RAM 63 or the storage unit 69, if necessary.

The computer programs are stored in advance, for example, in a hard disk or a ROM (Read Only Memory). Alternatively, the computer programs may be stored (recorded) temporarily or permanently in the removable medium 72 such as a flexible disk, a CD-ROM (Compact Disc Read Only Memory), a MO (Magneto-Optical) disc, a DVD (Digital Versatile Disc), a magnetic disk, and a semiconductor memory, and may be read by the drive 71. The computer programs may be transmitted to a computer from a download site by wireless or may be transmitted to the computer via a network such as a LAN (Local Area Network) or the Internet by wire. The computer may receive the computer programs transmitted via the communication unit 70 and install the received computer programs in a recording medium such as a built-in hard disk.

The CPU 61 executes the computer programs and causes the computer system 60 to serve as functional means for detecting a moving object in a motion detection region using a present image and a previous image by a plurality of moving object detection setups. The computer system 60 is caused to serve as functional means for determining that the moving object is detected in the motion detection region when the moving object is detected by one of the plurality of moving object detection setups, and outputting the moving object detection result of the motion detection region. The computer system 60 is caused to serve as functional means for using a plurality of moving object detection setups or processes having different moving object detection characteristics or factors depending on remoteness or nearness of the moving object detected from an image of the motion detection region as the plurality of moving object detection setups.

In this way, it is possible to precisely detect a moving object regardless of the remoteness or nearness of the moving object on the basis of the image signal input from the input unit 67 or the image signal supplied via the communication unit 70.

According to one or more embodiments, a moving object in a motion detection region is detected by the plurality of moving object detectors using a present image and a previous image. When the moving object is detected by one of the plurality of moving object detection processors, it is determined that the moving object is detected in the motion detection region, and the moving object detection result of the motion detection region is output. The plurality of moving object detection processors having different moving object detection characteristics depending on remoteness or nearness of the moving object detected from an image of the motion detection region are used as the plurality of moving object detection processors. Accordingly, it is possible to precisely detect a moving object, whether the moving object is located remotely or nearby. Therefore, the invention can be suitably applied to a monitoring system, an intrusion detection system or the like.

For example, embodiments of the present invention include methods for detecting a moving object using one or more detection factors (first detection factors, or first factors) to detect movement of an object to provide a first object detection output using one or more detection factors (second detection factors, or second factors) to detect movement of an object to provide a second object detection output and producing an output if first and/or second object detection output is provided.

Another example of embodiments of the present invention includes the first detection factors including, for example, a first detecting method, first spatial direction resolution, and a first time domain resolution. Also, using the one or more first detection factors may also include selecting a first moving object detecting process from among a plurality of moving object detecting processes.

Furthermore, the second detection factors may include, for example, a second detecting method, a second spatial direction resolution, and a second time domain resolution.

It is to be understood that the present invention can be implemented in various forms of hardware, software, firmware, special purpose processes, or a combination thereof. In one embodiment, at least parts of the present invention can be implemented in software tangibly embodied on a computer readable program storage device. The application program can be downloaded to, and executed by, any device comprising a suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. An apparatus for detecting movement of an object captured by an imaging device, the apparatus comprising:
   a moving object detection unit,
      configured to detect movement of an object based on a first moving object detecting process, and
      configured to detect movement of the object based on a second moving object detecting process; and
   an output unit configured to generate an output based on the detection by said moving object detection unit based on at least one of the first and second moving object detecting processes,
   wherein the moving object detection unit includes first and second moving object detection processors and wherein the first moving object detection processor includes a first processing requirement such that the first moving object detecting process is selected based on the first processing requirement.

2. The apparatus according to claim 1, wherein the first moving object detecting process is different than the second moving object detecting process.

3. The apparatus according to claim 1, wherein each of the first and the second moving object detecting processes operates in accordance with at least one of a plurality of detection factors.

4. The apparatus according to claim 3, wherein the at least one of the plurality of detection factors comprises motion vector detection, using a plurality of captured images.

5. The apparatus according to claim 4, wherein the plurality of captured images includes one or more previously captured images or presently captured images.

6. The apparatus according to claim 3, wherein the at least one of the plurality of detection factors comprises normalized correlation detection, using a plurality of captured images.

7. The apparatus according to claim 6, wherein the plurality of captured images includes one or more previously captured images or one or more presently captured images.

8. The apparatus according to claim 6, wherein the at least one of the plurality of detection factors comprises at least one of
   a spatial resolution associated with distance on an image display screen and
   a temporal resolution associated with an interval between captured images.

9. The apparatus according to claim 1, wherein the moving object detection unit includes a camera.

10. The apparatus according to claim 1, further comprising:
    a coordinate specifying unit configured to provide a motion detection region,
    wherein the moving object detection unit is configured to detect the movement of the object within the motion detection region
       wherein the output comprises an indication of proximity of the location of the object relative to the imaging device.

11. The apparatus according to claim 1,
    wherein the first moving object detecting process corresponds to a location of the object having a first proximity with respect to the imaging device,
    wherein the second moving object detecting process corresponds to a location of the object having a second proximity with respect to the imaging device,
    wherein the first proximity is further from the imaging device than the second proximity.

12. The apparatus according to claim 1, wherein the second moving object detection process includes a second processing requirement such that the second moving object detecting process is selected based on the second processing requirement.

13. The apparatus according to claim 1, wherein at least one of the first moving object detecting process and the second moving object detecting process comprise a process including:
    motion vector detection and normalized correlation detection.

14. The apparatus according to claim 1, wherein at least one of the first moving object detecting process and the second moving object detecting process comprise a process including:
    spatial resolution including a first resolution spatial setting and a second resolution spatial setting,
    wherein the first resolution spatial setting is lower than the second resolution spatial setting.

15. The apparatus according to claim 1, wherein at least one of the first moving object detecting process and the second moving object detecting process comprise a process including:
    temporal resolution including a first frame rate setting and a second frame rate setting,
    wherein the first frame rate setting is lower than the second frame rate setting.

16. The apparatus according to claim 1, wherein the first moving object detecting process and the second moving object detecting process comprise processes including:
    motion vector detection and normalized correlation detection;
    a first resolution spatial setting and a second resolution spatial setting,
    wherein the first resolution spatial setting is lower than the second resolution spatial setting.

17. The apparatus according to claim 1, wherein the first moving object detecting process and the second moving object detecting process comprise processes including:

motion vector detection and normalized correlation detection; and a first frame rate setting and a second frame rate setting, wherein the first frame rate setting is lower than the second frame rate setting.

18. The apparatus according to claim 1, wherein the first moving object detecting process and the second moving object detecting process comprise processes including:
   motion vector detection and normalized correlation detection;
   a first resolution spatial setting and a second resolution spatial setting; and
   a first frame rate setting and a second frame rate setting, wherein the first resolution spatial setting is tower than the second resolution spatial setting; and
   wherein the first frame rate setting is lower the second frame rate setting.

19. A method for detecting a moving object comprising:
   using one or more first detection factors to detect movement of an object to provide a first object detection output;
   selecting a first moving object detecting process from among a plurality of moving object detecting processes based on a processing power requirement for executing the selected first moving object detecting process,
   using one or more second detection factors to detect movement of the object to provide a second object detection output; and
   producing an output if said first or second object detection output is provided.

20. The method of claim 19, wherein the first object detection output is different than the second object detection output.

21. The method according to claim 20, wherein the first detection factors comprise:
   a first detecting method;
   a first spatial direction resolution; and
   a first time domain resolution.

22. The method according to claim 20, wherein the second detection factors comprise:
   a second detecting method;
   a second spatial direction resolution; and
   a second time domain resolution.

23. The method according to claim 20, wherein using the one or more first detection factors comprises:
   selecting a first moving object detecting process from among a plurality of moving object detecting processes.

24. The method according to claim 23, wherein selecting the first moving object detecting process comprises:
   selecting a normalized correlation detecting method.

25. The method according to claim 23, wherein selecting the first moving object detecting process comprises:
   selecting a normalized correlation detecting method; and
   reducing a spatial direction resolution associated with distance on a display screen, wherein the spatial direction resolution is reduced as a function of the object being closer with respect to captured images of the object.

26. The method according to claim 23, wherein selecting the first moving object detecting process comprises:
   selecting a normalized correlation detecting method; and
   increasing a temporal resolution associated with an interval between captured images of the object, wherein the temporal resolution is increased as a function of the object being located closer with respect to the captured images of the object.

27. The method according to claim 23, wherein selecting the first moving object detecting process comprises:
   selecting a normalized correlation detecting method;
   reducing a spatial direction resolution associated with distance on a display screen, wherein the spatial direction resolution is reduced as a function of the object being located closer with respect to captured images of the object; and
   increasing a temporal resolution associated with an interval between the captured images of the object, wherein the temporal resolution is increased as a function of the object being located closer with respect to the captured images of the object.

28. The method according to claim 20, wherein using the one or more second detection factors comprises:
   selecting a second moving object detecting process from among a plurality of moving object detecting processes based on a processing power requirement for executing the selected second moving object detecting process.

29. A non transitory computer readable recording medium for storing a computer program for detecting a moving object, wherein the program executes the steps of:
   using one or more first detection factors to detect movement of art object to provide a first object detection output;
   selecting a first moving object detecting process from among a plurality of moving object detecting processes based on a processing power requirement for executing the selected first moving object detecting process,
   using one or more second detection factors to detect movement of an object to provide a second object detection output; and
   producing an output if said first and/or second object detection output is provided.

30. The computer readable recording medium of claim 29, wherein the first object detection output is different than the second object detection output.

31. A moving object detector comprising:
   a processing unit configured to operate in accordance with one or more first parameters to detect movement of an object and produce a first object detection output,
      said processing unit being further configured to operate in accordance with one or more second parameters, the one or more second parameters being different than the one or more first parameters, to detect the movement of an object and produce a second object detection output; and
   a detection result processor configured to produce an output indicating a moving object if at least one output from the processing unit is produced,
   wherein the processing unit includes a first processing requirement such that a first moving object detecting process is selected based on the first processing requirement.

* * * * *